United States Patent Office 3,636,179
Patented Jan. 18, 1972

3,636,179
METHOD FOR PRODUCING ETHYLDIPHENYLS SUITABLE AS HEAT TRANSFER MEDIA
Hiroharu Inoue, Kitakyushu-shi, Kenichi Fujimoto, Fukuoka-ken, and Yasushi Suenaga, Kitakyushu-shi, Japan, assignors to Nippon Steel Chemical Co., Ltd., Tokyo, Japan
Filed Dec. 12, 1969, Ser. No. 884,583
Claims priority, application Japan, Dec. 21, 1968, 43/93,476, 43/93,477
Int. Cl. C07c 15/14, 15/04
U.S. Cl. 260—668 R                                8 Claims

ABSTRACT OF THE DISCLOSURE

Minimization of the formation of 2-ethyldiphenyl and 9-methylfluorene in the production of ethyldiphenyls is possible by carrying out the reaction between diphenyl and ethylbenzenes in the presence of a Friedel-Crafts catalyst with a molar ratio of ethylbenzenes to diphenyl of at least 1.5, at a temperature of 70–130° C. and keeping the conversion of diphenyl below 75% by weight.

FIELD OF THE INVENTION

This invention relates to a method for producing ethyldiphenyls in general and, more particularly, ethyldiphenyls especially suitable as heat transfer media, wherein the proportion of the 3- and 4-isomers of ethyldiphenyl is increased while the formation of by-products such as 2-ethyldiphenyl and 9-methylfluorene is suppressed. This invention also relates to ethyldiphenyl compositions advantageously applicable as heat transfer media.

THE PRIOR ART

It is disclosed in U.S. Pat. 3,247,275 that the ethyldiphenyls are dehydrogenated to vinyldiphenyls which, upon copolymerization with butadiene, yield an elastomer useful in preparing high impact polystyrene resins. The ethyldiphenyls produced according to the method disclosed in said patent are said to contain considerable amounts of the 2-isomer. This particular isomer affects adversely the dehydrogenation reaction of the ethyldiphenyls. Consequently, various methods have been proposed to suppress the formation of the 2-isomer in the production of ethyldiphenyls, but even so the ethyldiphenyls produced by the conventional method are not suitable as heat transfer media. This is so because the ethyldiphenyls produced by the conventional method contain relatively large quantities of 9-methylfluorene in addition to the 2-isomer and these byproducts, in particular 9-methylfluorene, cause considerable deterioration in heat stability when the ethyldiphenyls are used as heat transfer media.

SUMMARY OF THE INVENTION

The above mentioned disadvantages have been overcome by the present invention which provides a method for producing ethyldiphenyls with tolerable amounts of 2-ethyldiphenyl and 9-methylfluorene therein. Another object of this invention is to provide a method for producing ethyldiphenyls which is simple to carry out and is accompanied by the least evolution of heat.

A further object of this invention is to provide a method for producing ethyldiphenyls which can be carried out on a commercial scale under quite advantageous conditions since the reaction can be carried out in the liquid phase and in a simple apparatus, thus obviating complex and expensive apparatus such as those generally required for gas phase reactions. A still further object of this invention is to provide an excellent heat transfer medium which has a low pour point, a high boiling point, low toxicity, and is not corrosive.

BRIEF DESCRIPTION OF THE DRAWINGS

Details of the objects of this invention will become apparent from the following description thereof and from the accompanying drawings, in which.

In the foregoing figures, DP, PEB, MED, and DED represent respectively diphenyl, ethylbenzenes, ethyldiphenyls, and diethyldiphenyls.

DETAILED DESCRIPTION OF THE INVENTION

In the quest for a method for minimizing the formation of 2-ethyldiphenyl and 9-methylfluorene in the production of ethyldiphenyls, it has been found that this purpose can be accomplished by carrying out the reaction of diphenyl with ethylbenzenes in the presence of a Friedel-Crafts catalyst while employing at least 1.5 moles of ethylbenzenes (calculated in terms of ethyl radicals) per mole of diphenyl, at a temperature in the range of 70–130° C. and while maintaining the conversion of diphenyl below the 75% by weight level.

According to U.S. Pat. 3,247,275 mentioned above, 1 mole of diphenyl is reacted with 0.3–0.7 mole of ethylene or with 0.3–1.0 mole of an ethylene-yielding compound such as diethylbenzene in the presence of a Friedel-Crafts catalyst. The ratio of the sum of the 3- and 4-isomers to the 2-isomer amounts to 11.8.

Figures 1, 2:
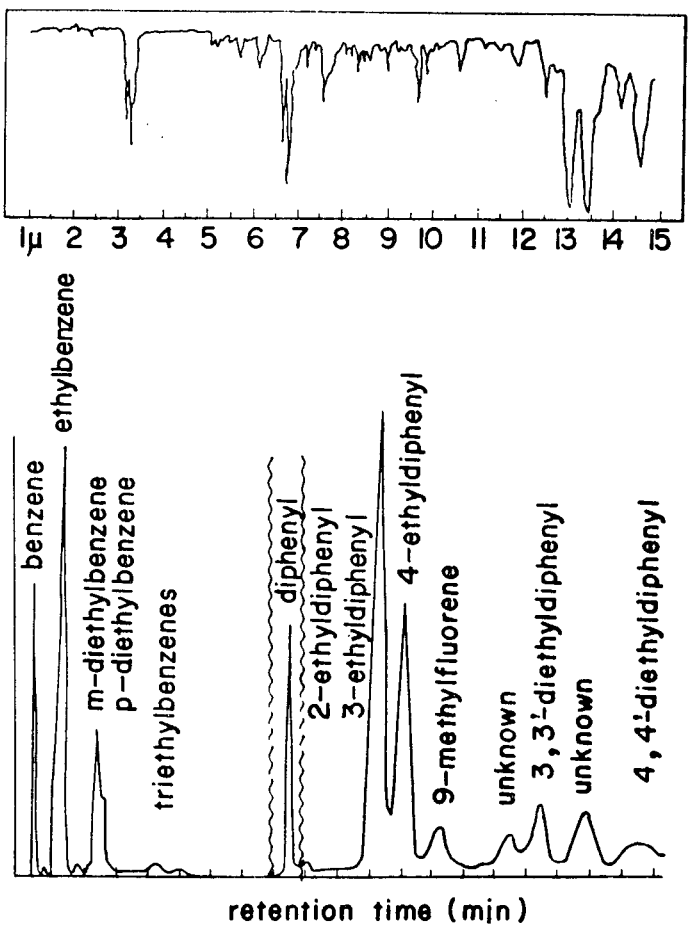
FIG. 1 is an infrared absorption spectrographic chart of the substance identified as 9-methylfluorene.
FIG. 2 shows a gas chromatogram of the reaction product obtained in accordance with this invention.

Upon gas chromatographic examination of the reaction products, it has been found that the heat stability of the ethyldiphenyls as heat transfer media varies with the content of substance the peak of which appears immediately after that of a 4-ethyldiphenyl, this substance being identified as 9-methylfluorene on the basis of gas chromatographic and infrared spectral evidence (FIGS. 1 and 2). The volatility of 9-methylfluorene is very close to those of 3- and 4-ethyldiphenyls and the separation of these compounds by distillation is difficult.

According to this invention, the formation of 2-ethyldiphenyl and 9-methylfluorene is influenced to a considerable extent by the ratio of diphenyl to ethylbenzenes in the feed, the conversion of diphenyl, and the amount of diethyldiphenyls added. It was therefore found that the formation of the undesirable by-products can be greatly minimized by reacting ethylbenzenes and diphenyl in such a manner that the former be present in an amount of at least 1.5 moles of ethyl radicals per mole of the latter, maintaining the conversion of diphenyl below 75% by weight, and keeping the molar ratio of diethyldiphenyls to diphenyl at 0.5 or less.

With respect to the reaction temperature, the reaction becomes difficult to control when the temperature exceeds 130° C. On the other hand, the reaction becomes too sluggish to be economical when the temperature falls below 70° C. A clearer understanding of the effects of the reaction conditions are obtained by referring to the accompanying FIGS. 3 through 7.

The ethylbenzenes suitable in accordance with this invention include ethyl derivatives of benzene such as ethylbenzene, diethylbenzenes, triethylbenzenes, and tetraethylbenzenes; ethyl derivatives of toluene such as ethyltoluenes and diethyltoluenes; and mixtures thereof, as mentioned herein above. In carrying out this invention, it is economically desirable to use ethylbenzenes formed as byproducts in the production of ethylbenzene from benzene. Such ethylbenzenes contain diethylbenzenes as the major component, with smaller amounts of mono-, tri-, and tetraethylbenzenes, and when they are used as a feed, it is necessary to adjust the molar ratio such that the total number of moles of ethyl radicals in mixture of mono-, di-, tri-, and tetraethylbenzenes is 1.5 or more per mole of diphenyl. The conversion should be preferably kept at about 60% by weight. The amount of the by-product diethyldiphenyls increases as the conversion figure rises. The diethyldiphenyls can be separated readily from the ethyldiphenyls by distillation, but an increase in the amount of diethyldiphenyls causes a decrease in the yield of ethyldiphenyls, which is undesirable.

The presence, however, of some diethyldiphenyls in the system, prior to the start of the reaction, enhances the selectivity of the conversion of diphenyl to ethyldiphenyls and it is preferable to have 0.5 mole or less of diethyldiphenyls present per mole of diphenyl. In such instances, it should be kept in mind that diethyldiphenyls in excess of 0.5 mole tend to cause an increase in the formation of 9-methylfluorene.

As explained above, the reaction temperature according to this invention should be kept in the range of 70–130° C. The temperature is controlled with ease since the solidification point of the reaction mixture is below 50° C. and the reaction is substantially devoid of evolution of heat. Contrary to this, the conventional method is difficult to carry out, since gaseous ethylene is reacted with diphenyl and the reaction is furthermore exothermic.

Friedel-Crafts catalysts suitable for the method of this invention include aluminum chloride, boron trifluoride, and the like, and the amount added should be preferably of the order of 0.01–0.1 mole per mole of diphenyl. The amount of catalyst does not affect the composition of reaction to products to any appreciable extent, but the reaction rate increases with an increasing amount of catalyst when the amount thereof exceeds 0.1 mole, the reaction rate becoming too high to keep the conversion under control. Furthermore, the use of excessive amounts of catalyst is also undesirable from an economical standpoint.

The method of this invention yields ethyldiphenyls in which the ratio of the sum of the 3- and 4-isomers to the 2-isomer is often 98 or more and the amount of 9-methylfluorene is small, so that the ethyldiphenyls produced may provide excellent heat transfer media.

It has been found, moreover, that the ethyldiphenyl compositions in which the sum of the 3- and 4-isomers is 80% by weight or more, the ratio of the 4-isomer to the 3-isomer is 2.5 or less, the 2-isomer is substantially absent, and 9-methylfluorene is 20% by weight or less, are particularly suitable as heat transfer media.

In general, that stability at high temperatures is an essential requirement for heat transfer media and a substance with a sufficiently high boiling point to obviate the need for application of pressure is highly desirable. Furthermore, a heat transfer medium in liquid form is easy to handle while loading it into an apparatus as it is not subject to plugging when the apparatus is not being operated. A solidification point of 0° C. or lower is desirable under ordinary circumstances.

The boiling points of 3-ethyldiphenyl, 4-ethyldiphenyl, and 9-methylfluorene are close to one another and a mixture of these three compounds boils at about 290° C. at standard atmospheric pressure, although a deviation of a few degrees is possible depending upon variations in the mixture composition. The solidification point of the mixture is not as clearly defined as is the case of a single substance, and it may be expressed in terms of the pour point as described in the following examples. The pour point varies considerably with the composition of the three compounds: the pour point (solidification point) of pure 4-ethyldiphenyl becomes 34° C., but is lower when the content of 3-ethyldiphenyl increases and it reaches about −30° C. when the ratio of the 4-isomer to the 3-isomer is about 0.5. The pour point becomes also lower when the amount of 9-methylfluorene increases. Consequently, it is necessary to reduce the ratio of the 4-isomer to the 3-isomer so as to obtain a lower pour point. A ratio of 2.5 or less is required to obtain a pour point comparable to that of a eutectic mixture of diphenyl and diphenyl ether, which is a well known heat transfer medium (an example being Dowtherm A). The pour point of 0° C. or less will require a ratio of 2 or less.

The heat stability of the ethyldiphenyl composition begins to deteriorate noticeably as the content of 9-methyl fluorene in such a composition reaches about the 20% by weight mark, and deterioration is particularly pronounced at a temperature of about 400° C. However, lowering of the content of 9-methylfluorene down to a few percentiles minimizes the deterioration even at 400° C. At a working temperature below 350° C., such as is commonly used for heat transfer media, 9-methylfluorene does not affect appreciably the heat stability of the abovementioned composition, as long as the content of 9-methylfluorene remains below the 20% by weight level.

It is thus apparent that the ethyldiphenyl composition is a useful heat transfer medium from the view point of the pour point and heat stability, provided that the ratio of the 4-isomer to the 3-isomer in the composition is kept below 2.5 and the content of 9-methylfluorene below 20% by weight. To this effect it may become necessary to vary the composition, for example, by lowering the abovementioned ratio below 2 and the content of 9-methylfluorene below 10% by weight, depending upon the conditions under which the heat transfer medium is to operate. Such variations can be obtained by proper selection of the reaction conditions as mentioned above or as explained later with reference to the examples.

A gas-chromatographic analysis indicates that the reaction products are composed of benzene, ethylbenzene, diethylbenzenes, diphenyl, 3-ethyldiphenyl, 4-ethyldiphenyl (2-ethyldiphenyl being less than 1% by weight of the whole ethyldiphenyls), 9-methylfluorene, diethyldiphenyls, and others, and can be separated by distillation into three fractions; forerun, product fraction, and after-run. The product fraction is mainly composed of 3-ethyldiphenyl, 4-ethyldiphenyl and 9-methylfluorene, and is accompanied by small amounts of diphenyl and diethyldiphenyls depending upon the condition used for distillation.

As described above the ethyldiphenyl composition which is particularly suitable as a heat transfer medium can be produced relatively easily on a commercial scale according to the method of the invention, and the composition thus produced has a boiling point of about 290° C. and a low pour point and is easy to handle.

DESCRIPTION OF EXAMPLES

Example 1

A mixture of ethylbenzenes of the composition shown in Table 1 was used in this and in the following examples. This mixture was obtained as a by-product in the production of ethylbenzene from benzene and ethylene by a known process.

TABLE 1

| Component | Composition (mol percent) | Remark |
|---|---|---|
| Ethylbenzene | 1.5 | The average molecular weight of this composition is 138.8 and the average number of ethyl radicals is 2.1. Therefore, 66.1 g. of this composition is taken as 1 mole. |
| Diethylbenzenes | 78.4 | |
| Triethylbenzenes | 12.5 | |
| Tetraethylbenzenes | 2.3 | |
| Unidentified | 5.3 | |

To study the effect of the amount of ethylbenzenes added, the experiments were carried out at three different molar ratios of ethylbenzenes to diphenyl, namely 2.44, 2.03, and 1.62, by charging ethylbenzenes and diphenyl in a reactor, heating the mixture to 90° C. with stirring, and then adding 0.03 mole of AlCl$_3$ per mole of diphenyl. The reaction mixture was sampled at regular intervals. The AlCl$_3$ was decomposed with addition of water, and the same thus obtained was analyzed by gas chromatography to see how the composition of reaction products changed as the reaction progressed. The gas chromatographic analysis was carried out under the following conditions: column, apiezone grease (30%)/Celite 545, 3 m.; column temperature, 240° C.; carrier gas, hydrogen; flow rate, 240 cc./min.; detector temperature, 300° C. A gas chromatographic chart is shown in FIG. 2 as an example.

Figure 3:
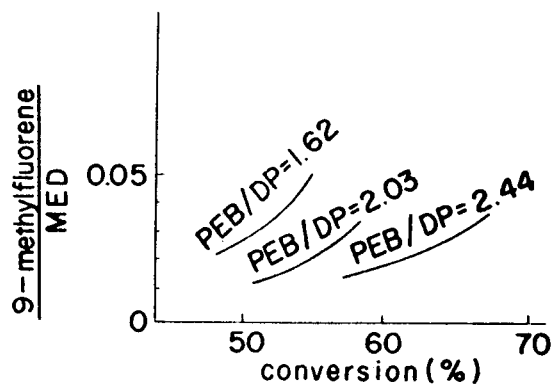
FIG. 3 is a diagram showing the effects of the conversion of diphenyl and the ratio of ethylbenzenes to diphenyl on the formation of 9-methylfluorene. The term "ethylbenzenes" whenever used in this specification and claims means any of the ethyl derivatives of benzene, such as ethylbenzene, diethylbenzenes, triethylbenzenes, tetraethylbenzenes, or ethyl derivatives of toluene, such as ethyltoluenes, and diethyltoluenes, or any mixture thereof, and has been abbreviated to PEB in the drawings.
Figure 4:
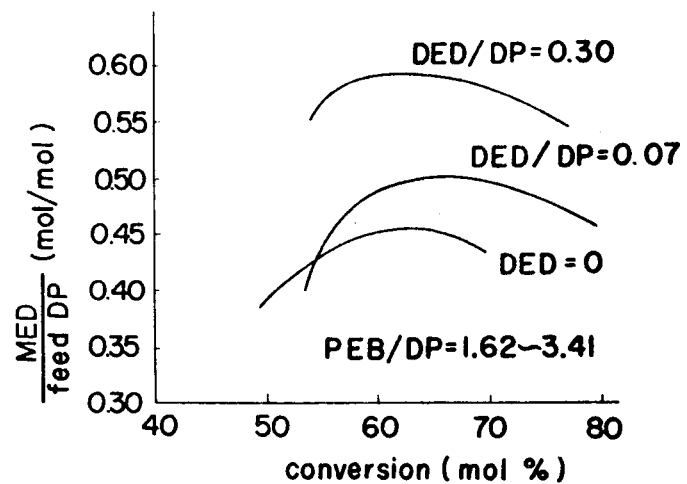
FIG. 4 is a diagram showing the relationship between the conversion of diphenyl and the ratio of the ethyldiphenyls produced to the diphenyl feed, when the ratios of ethylbenzenes to diphenyl and of diethyldiphenyls to diphenyl are respectively changed.
Figure 5:
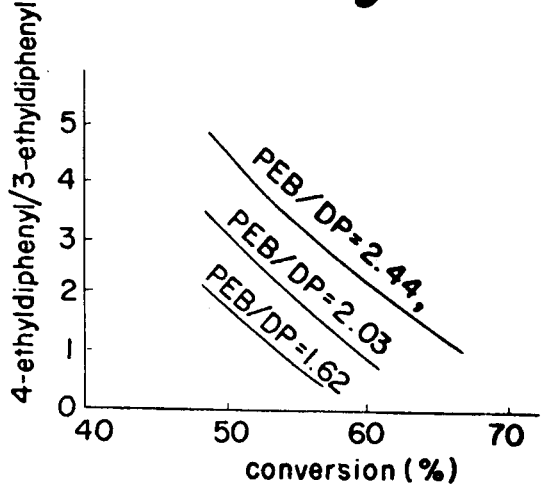
FIG. 5 is a diagram showing the relationship between the conversion of diphenyl and the ratio of the 4-isomer to the 3-isomer.

As shown in FIG. 3, the formation of 9-methylfluorene varies with the conversion of diphenyl and also with the ratio of ethylbenzenes to diphenyl (PEB/DP). The relationship between the conversion of diphenyl and the ratio of the ethyldiphenyls produced to the diphenyl fed is shown in FIG. 4. It is seen from FIG. 3 that the formation of 9-methylfluorene tends to increase with an increasing conversion of diphenyl and with a decreasing ratio of PEB/DP at the same conversion level. On the other hand, FIG. 4 indicates that the ratio of the ethyldiphenyls produced to the diphenyl fed does not depend very much on PEB/DP. The proportion of the 2-isomer was found to range from 0.1 to 1.0% by weight. The relationship between the conversion of diphenyl and the ratio of the 4-isomer to the 3-isomer is shown in FIG. 5.

Example 2

Figure 6:
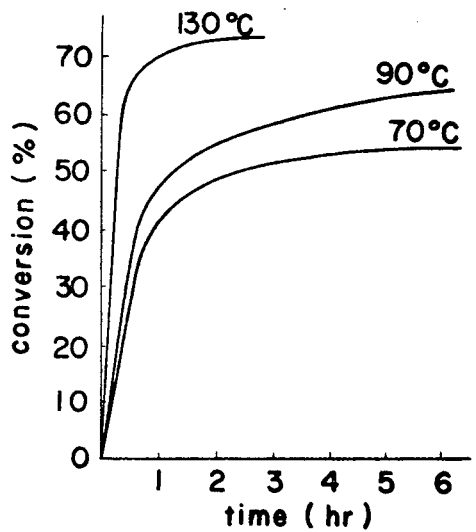
FIG. 6 is a diagram showing the relationship between the reaction time and the conversion of diphenyl at different reaction temperatures.

The procedure of Example 1 was followed at three different temperatures, namely 70, 90, and 130° C., to study the effects of reaction temperature and time on the conversion. The results are shown in FIG. 6. It may be seen that the reaction is too slow below 70° C. and is too fast above 130° C.

Example 3

Figure 7:
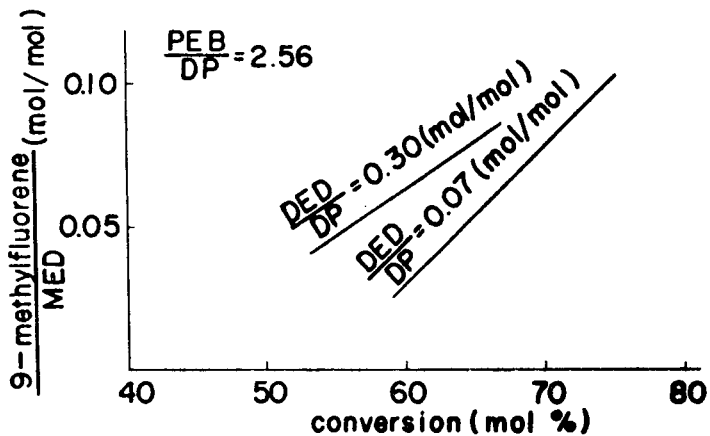
FIG. 7 is a diagram showing how a change in the ratio of diethyldiphenyls to diphenyl affects the conversion of diphenyl and the formation of 9-methylfluorene.

The procedure of Example 1 was followed under the following conditions: PED/DP=0.07 and 0.30; temperature, 120° C.; AlCl$_3$/DP=0.03. The results are shown in FIGS. 4 and 7. The ratio of MED to the feed DP increases as DED/DP increases, but the formation of 9-methylfluorene increases at the same time. Thus some addition of DED is favorable but an excessive addition tends to increase the formation of the undesirable 9-methylfluorene.

Example 4

The procedure of Example 1 was followed while using diethyltoluene under the following conditions: molar ratio of diethyltoluenes to diphenyl, 2; temperature 120° C., AlCl$_3$/DP=0.02, reaction time, 2 hours. The results were as follows: conversion of diphenyl, 65.6% by weight; molar ratio of the ethyldiphenyl formed to diphenyl fed 1.0; amount of the 2-isomer and 9-methylfluorene, negligible; molar ratio of the diethyldiphenyls formed to the diphenyl reacted, 0.3.

Comparative example

Diphenyl was melted at 90° C., 0.03 mole of AlCl$_3$ was added per mole of diphenyl, and gaseous ethylene was introduced. The reaction was continued until 0.98 mole of ethylene were absorbed per mole of diphenyl, and the reaction product was analyzed. The results of the analysis are shown in Table 2.

Table 2

| Components: | Composition (mol percent) |
|---|---|
| Diphenyl | 39.6 |
| 2-ethyldiphenyl | 3.8 |
| 3-ethyldiphenyl | 11.4 |
| 4-ethyldiphenyl | 8.2 |
| 9-methylfluorene | 5.7 |
| Diethyldiphenyls | 31.3 |

It is seen from Table 2 that the ratio of (3-isomer+4-isomer) to 2-isomer is 5.15; the ratio of 9-methylfluorene to ethyldiphenyls is 0.24. In comparison with this, the method of this invention give values of 98% by weight or more and 0.1% by weight respectively.

Example 5

Figure 8:
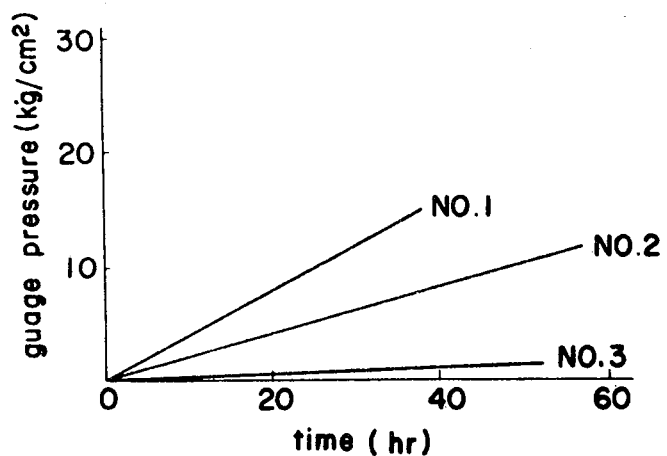
FIG. 8 is a diagram showing the behavior of the ethyldiphenyl composition of this invention when heated at 400° C.

The heat stability was tested on three samples having different ratios of the 4-isomer to the 3-isomer and different contents of 9-methylfluorene. The test was carried out as follows: 500 g. of the sample were charged to a 1-liter autoclave, and heated to 200° C. The autoclave was vented, the pressure gauge was set at zero, and the sample was heated at a given temperature with shaking. The rise in pressure with the passage of time at 400° C. is shown in FIG. 8.

The same procedure was repeated for an identical sample at 350 and 320° C., but the pressure rise was extremely small at these temperatures, for example less than 1 kg./cm.$^2$ at 350° C. after 390 hours for No. 3 sample.

The compositions of the three samples as determined by gas chromatography are shown in Table 3 and a comparison of a few properties before and after heating is given in Table 4 for No. 3 sample.

TABLE 3

| Sample No.: | Composition (mol percent) | | | |
|---|---|---|---|---|
| | Diphenyl | 3-ethyl-diphenyl | 4-ethyl-diphenyl | 9-methyl-fluorene |
| 1 | 1.1 | 45.6 | 36.4 | 16.9 |
| 2 | 1.2 | 35.5 | 53.7 | 9.6 |
| 3 | 0.8 | 44.3 | 51.2 | 3.7 |

The test results indicate that the heat stability deteriorates as the content of 9-methylfluorene increases, but it is sufficiently high even when the content of 9-methylfluorene reaches 17% by weight. Furthermore the samples containing less than 10% by weight 9-methylfluorene are undoubtedly excellent heat transfer media.

TABLE 4.—(EXAMPLE NO. 3)

|  | Before heating | Test Conditions | | |
|---|---|---|---|---|
|  |  | Temp. 400° C., time 52 hr. | Temp. 350° C., time 390 hr. | Temp. 320° C., time 480 hr. |
| Results: |  |  |  |  |
| Appearance | (1) | (1) | (1) | (1) |
| Specific gravity (20° C.) | 1.005 | 1.004 | 1.006 | 1.006 |
| Pour point (° C.) | −12 | −17 | −18 | −17 |
| Viscosity (CP, 20° C.) | 5.6 | 5.7 | 5.7 | 5.6 |
| Residual carbon (wt. percent) | Trace | 0.11 | 0.09 | 0.02 |
| Distillation test: |  |  |  |  |
| First drop (° C.) | 289 | 257 | 278 | 279 |
| 5% (° C.) | 291 | 289 | 289 | 289 |
| 90% (° C.) | 294 | 294 | 295 | 292 |
| Dry point (total distillate) (° C.) | 2 305 | 3 299 | 4 300 | 5 296 |

[1] Light yellow.
[2] 97.5%.
[3] 95.0%.
[4] 96.0%.
[5] 97.8%.

Example 6

Figure 9:
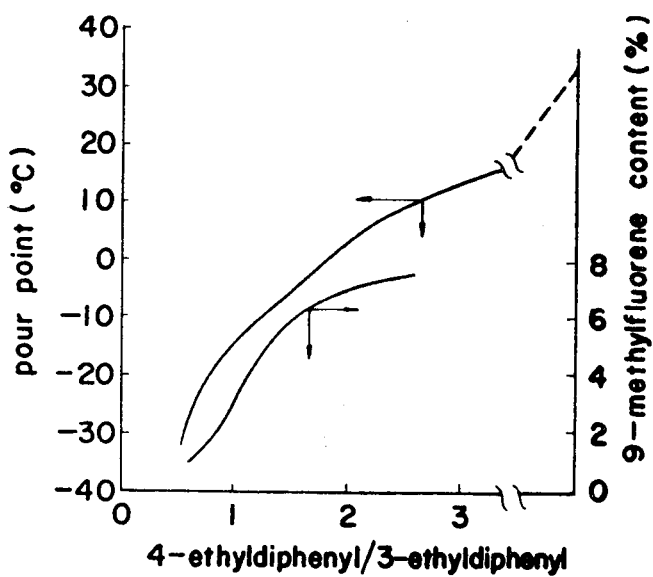
FIG. 9 is a diagram showing the relationship between the ratio of the 4-isomer to the 3-isomer in the ethyldiphenyl composition of this invention and the pour point.

The pour point was determined on samples having varying ratios of the 4-isomer to the 3-isomer, and the results are shown in FIG. 9. The content of 9-methylfluorene for each sample is also shown in FIG. 9. The procedure is as follows: The sample is placed in an apparatus for measuring the solidification point of benzene as specified in JIS K–2421, cooled at a rate of 1° C./min., and the temperature at which the stirring rod, 1.4 mm. in diameter and 3 g. in weight, falls a distance of 30 mm. in the sample in 20 seconds is taken as the pour point.

What is claimed is:

1. A process for producing ethyldiphenyls by alkylation of diphenyl which comprises reacting ethylbenzenes with diphenyl in a molar ratio of at least 1.5 moles of ethylbenzenes, calculated as ethyl radicals per mole of diphenyl, at a temperature in the range of from 70 to 130° C. while maintaining the conversion of the diphenyl below 75% by weight in the presence of a Friedel-Crafts catalyst.

2. The process according to claim 1 wherein said ethylbenzenes are diethylbenzenes containing small amounts of mono-, tri, and tetraethylbenzenes.

3. The process according to claim 1, wherein the conversion of diphenyl is maintained at about 60% by weight.

4. The process according to claim 1, wherein not more than 0.5 mole of diethyldiphenyls per mole of diphenyl is present in the reaction.

5. The process acording to claim 1, wherein from 0.01 to 0.1 mole of Fridel-Crafts catalyst is employed per mole of diphenyl.

6. An ethyldiphenyl composition particularly suitable as a heat transfer medium, comprising, by weight, 80% or more of 3- and 4-ethyldiphenyls, the ratio of 4-ethyldiphenyl to 3-ethyldiphenyl being not more than 2.5, and the balance 9-methylfluorene, and traces of 2-ethyldiphenyl.

7. The ethyldiphenyl composition according to claim 6 wherein the ratio of 4-ethyldiphenyl to 3-ethyldiphenyl is not more than 2.

8. The ethyldiphenyl composition according to claim 6 wherein the content of 9-methylfluorene is not more than 10% by weight.

References Cited

UNITED STATES PATENTS

| 2,172,391 | 9/1939 | Krase | 260—671 R |
| 2,324,784 | 7/1943 | Lieber | 260—671 R |
| 3,247,275 | 4/1966 | Soderquist et al. | 260—671 R |
| 3,290,402 | 12/1966 | Suld | 260—671 R |

DELBERT E. GANTZ, Primary Examiner

V. O'KEEFE, Assistant Examiner

U.S. Cl. X.R.

260—671 R